United States Patent
Rezag et al.

(10) Patent No.: US 7,318,622 B2
(45) Date of Patent: Jan. 15, 2008

(54) CONVERTIBLE SEAT FOR AN AIRCRAFT PASSENGER

(75) Inventors: Andre Rezag, Toulouse (FR); Bruno Saint-Jalmes, Toulouse (FR); Jazon Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 234 days.

(21) Appl. No.: 10/481,646

(22) PCT Filed: Nov. 27, 2003

(86) PCT No.: PCT/FR03/03501

§ 371 (c)(1),
(2), (4) Date: Jul. 15, 2004

(87) PCT Pub. No.: WO2005/035360

PCT Pub. Date: Apr. 21, 2005

(65) Prior Publication Data

US 2005/0067870 A1 Mar. 31, 2005

(30) Foreign Application Priority Data

Sep. 26, 2003 (FR) .................................. 03 11330

(51) Int. Cl.
*B60N 2/32* (2006.01)
*B60N 2/02* (2006.01)

(52) U.S. Cl. ..................................... 297/118; 297/378.1

(58) Field of Classification Search ................ 297/118, 297/14, 130, 120, 217.7, 217.1, 378.1, 112; 244/118.6; 5/118; *B60N 2/34*
See application file for complete search history.

(56) References Cited

U.S. PATENT DOCUMENTS

| 1,832,767 | A | * | 11/1931 | Dameron | ..................... 296/156 |
| 2,320,614 | A | * | 6/1943 | Kleine | ......................... 297/114 |
| 2,928,105 | A | * | 3/1960 | Bohnsack | ......................... 5/43 |

(Continued)

FOREIGN PATENT DOCUMENTS

| EP | 1 116 654 | | 7/2001 |
| GB | 2350787 A | * | 12/2000 |
| WO | 96/18537 | | 6/1996 |
| WO | 00/21831 | | 4/2000 |
| WO | 03/013903 | | 2/2003 |

*Primary Examiner*—David Dunn
*Assistant Examiner*—Tania Abraham
(74) *Attorney, Agent, or Firm*—Oblon, Spivak, McClelland, Maier & Neustadt, P.C.

(57) ABSTRACT

A convertible seat to accommodate an aircraft passenger. The seat includes a frame, a sitting portion borne by the frame, a back, and a jointed footrest along the transverse edge of the sitting portion. The seat can change from a so-called seated position in which the back forms an angle with the sitting portion and its base is close to the rear transverse edge of the sitting portion to a so-called lying-down position in which it has a more or less level surface intended to accommodate a passenger in the lying down position. The frame is a fixed frame. At most two of the elements of the whole constituted by the sitting portion, the back, and the footrest form the more or less level surface of the seat in lying-down position. At least one additional berth is provided to cooperate with the sitting portion and/or the back and/or the footrest to form the more or less level surface intended to accommodate a passenger in the lying-down position.

36 Claims, 12 Drawing Sheets

U.S. PATENT DOCUMENTS

| | | |
|---|---|---|
| 5,718,479 A | 2/1998 | Rautenbach |
| 6,000,751 A * | 12/1999 | Kato et al. ..................... 297/15 |
| 6,113,183 A * | 9/2000 | Koch et al. ............ 297/184.14 |
| 6,209,956 B1 * | 4/2001 | Dryburgh et al. ........... 297/245 |
| 6,352,309 B1 * | 3/2002 | Beroth .................. 297/354.13 |
| 6,371,556 B1 | 4/2002 | Arai |
| 6,846,042 B2 * | 1/2005 | Hanson et al. ......... 297/411.36 |
| 6,929,321 B1 * | 8/2005 | Shrock ....................... 297/118 |

\* cited by examiner

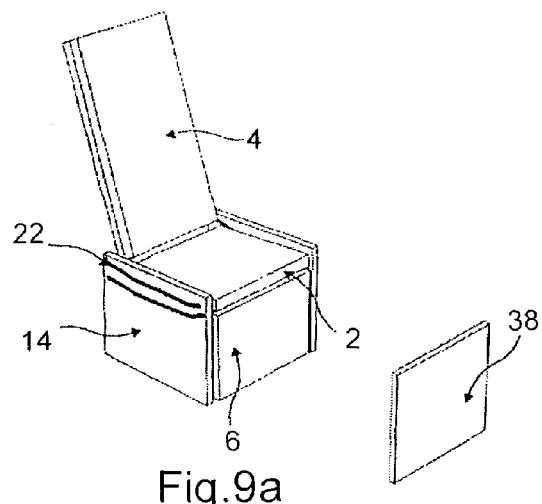
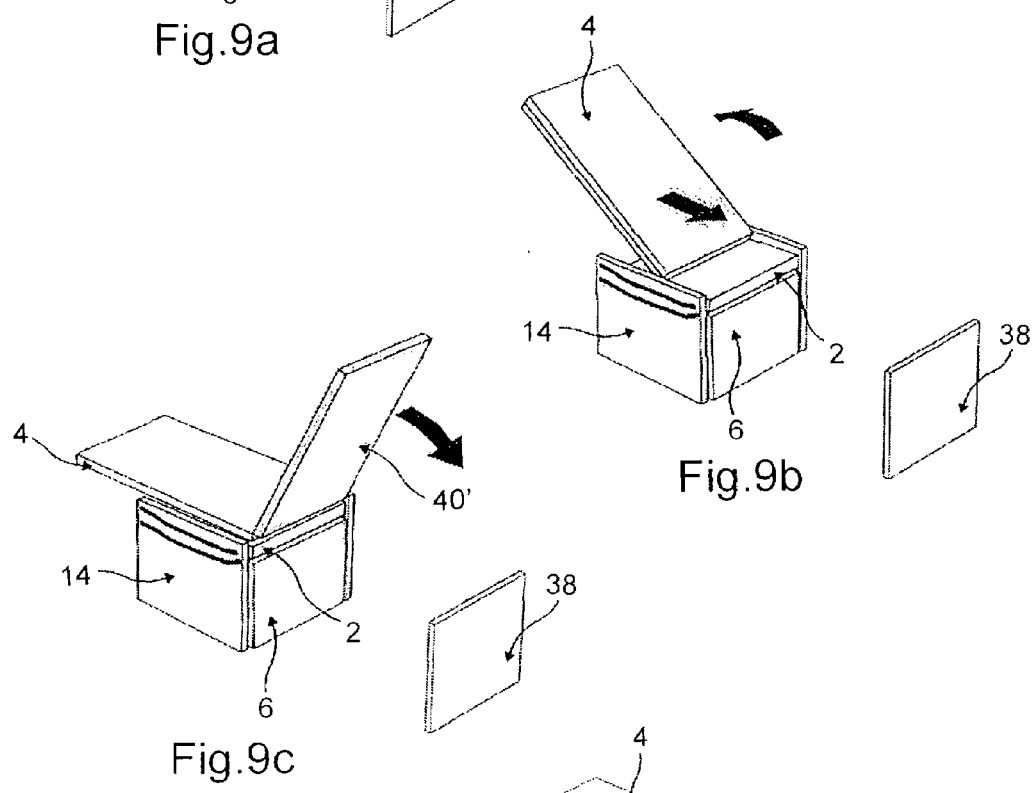
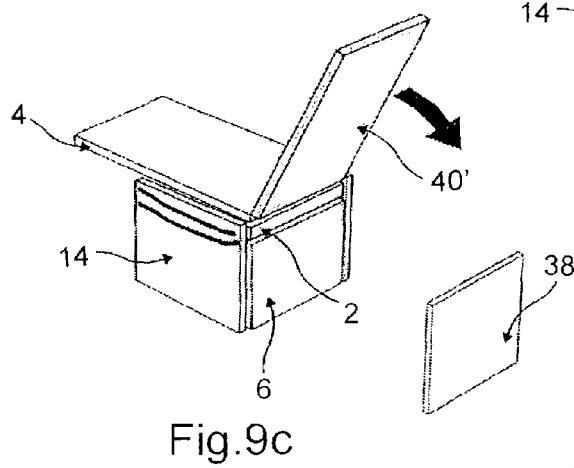
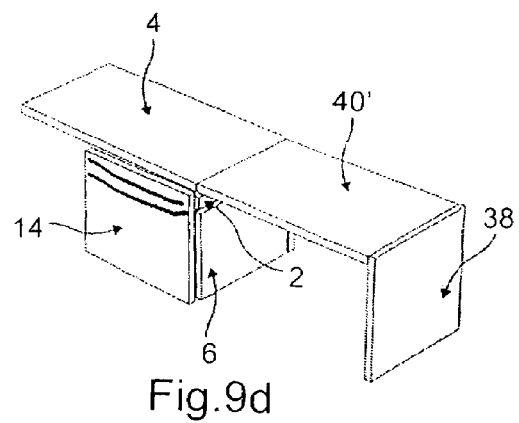

CONVERTIBLE SEAT FOR AN AIRCRAFT PASSENGER

FIELD OF THE INVENTION

This invention relates to a convertible seat intended to accommodate an aircraft passenger and more particularly, but not exclusively, such a seat intended to be surrounded by a wall defining the space around the seat intended for the individual traveling in this seat.

In aircraft intended to travel long distances, several comfort classes generally are offered to the passengers. One type of seat generally corresponds to each comfort class. Accordingly, for the highest comfort class there generally are seats convertible into a bed and thus allowing the passengers to sleep in a lying-down position. There also are seats having a tilting back and footrest. Finally, there also are seats, in general without a footrest, in which only the back can be slightly tilted.

The space set aside for a passenger varies according to the comfort class. For reasons of comfort and safety, the seat for one passenger must not encroach excessively upon the space set aside for a neighboring passenger, in particular the passenger occupying the seat positioned behind said seat. Thus, when the seats are relatively close to each other, the tilting of the back can be only a few degrees. When the seats are spaced farther apart, the tilting of the back can be greater. In the latter case, the tilting is limited according to the distance separating the free end of the seat in relation to the back of the sitting portion. Thus, by way of numerical example, it can be provided according to the distance separating two rows of seats, that one seat must not, for example, encroach more than 60 cm upon the space left in front of the seat located behind it, and this then corresponds, for example, to a 130° tilt of the back.

In the compartments of an aircraft offering a seat convertible into a bed, it is known, in order to enhance the comfort of the passengers in this compartment, to surround the seat with a wall isolating the individual traveling in the seat from the rest of the compartment. A seat which is converted into a bed by merely pivoting the back and the footrest to bring them into the plane of the sitting portion is not suited to such a compartment layout, because a considerable space is lost at the rear of each seat.

To solve this problem, document WO-96/18537 proposes a seat convertible into a bed which is found on the aircraft of some airline companies. This seat is implemented on a frame which is assembled sliding in relation to the floor of the cabin of the aircraft in which it is located. Then, in order to change from the armchair configuration able to accommodate a passenger in seated position to the bed configuration to accommodate a passenger in lying-down position, a motor causes the movable frame to slide while other motors act in particular on the back and the footrest to bring them more or less into the plane of the sitting portion of the seat.

Such a seat allows the passengers to travel under optimal comfort conditions. The seats described in this document, however, are very heavy, which puts the airline company at a disadvantage in terms of the number of passengers and pieces of luggage which can be loaded on board the aircraft.

SUMMARY OF THE INVENTION

This invention then has the purpose of supplying a seat convertible into a bed the mass of which is reduced. When this seat changes from its configuration provided for accommodating a seated passenger to its configuration provided for accommodating this passenger in lying-down position, or conversely, it preferably is advisable for the seat to remain within the space limits defined by a wall positioned around the seat and defining the space allotted to the passenger during the flight.

To this end, it proposes a convertible seat intended to accommodate an aircraft passenger, comprising a frame, a sitting portion borne by the frame and a back, this seat being able to change from a so-called seated position in which the back forms an angle with the supposedly horizontal sitting portion to a so-called lying-down position in which it has a more or less level surface intended to accommodate the passenger in lying-down position.

According to the invention, the frame is a fixed frame and the seat comprises on the one hand guiding means to make the back change from its seated position to a more or less horizontal position and, on the other hand, at least one additional berth cooperating with the back to form the more or less level surface intended to accommodate the passenger in lying-down position.

The frame here is the structure, more often than not metal, which bears the various components of the seat and which must withstand the stresses to which these components and the passenger are subjected in the event of mechanical demands. By keeping this frame fixed, the saving in weight can be appreciable. As a matter of fact, considering the magnitude of the stresses which the seat structure must be able to withstand, the mechanism making it possible to move this structure must be able to take up these stresses and therefore must be reinforced, which entails a considerable additional mass.

The guiding means are, for example, guiding means which make it possible for the back to have a rotary and possibly also translatory movement. The back then is used to implement the bedding surface with an additional berth which does not necessarily include the sitting portion and/or a possible footrest.

When the back has a base and a free end, then the guiding means for the seat advantageously comprise translatory guiding means for the base of the back. Such a translation makes it possible to make the most of the space available for a passenger and thus to convert the seat into a bed without having to encroach upon the space intended for another passenger.

More generally, this invention proposes a convertible seat intended to accommodate an aircraft passenger, comprising:
 a frame,
 a sitting portion borne by the frame,
 a back having a base and a free end, and
 possibly a jointed footrest along the transverse edge of the sitting portion between a position more or less perpendicular to the sitting portion and a position in which the plane of the sitting portion and the plane of the footrest form an obtuse, or even straight, angle,
 this seat being able to change from a so-called seated position, in which the back forms an angle with the sitting portion and its base is close to the rear transverse edge of the sitting portion, to a so-called lying-down position in which it has a more or less level surface intended to accommodate the passenger in lying down position.

According to the invention, the frame is a fixed frame, at most two of the elements of the whole constituted by the sitting portion, the back and the footrest form the more or less level surface of the seat in lying-down position, and at least one additional berth is provided to cooperate with the sitting portion and/or the back and/or the footrest to form the more or less level surface intended to accommodate the passenger in lying-down position.

The fact of keeping a frame fixed in relation to the aircraft cabin in which it is assembled makes possible a very appreciable saving in weight in relation to the convertible seats of the prior art which have a movable frame as indicated above. The seats of the prior art which are convertible likewise use their back, their sitting portion and their footrest to form the level surface intended to accommodate the passenger in lying-down position. With respect thereto, this invention proposes using at most only two of these three elements and an additional berth to obtain this level surface. Despite the use of a supplementary element, the overall mass of the convertible seat according to the invention can remain very appreciably smaller than the mass of the convertible seats of the prior art.

The elements of the whole constituted by the sitting portion, the back and the footrest and which form the more or less level surface if the seat in lying down position can change from their position corresponding to the seated position of the seat to their position corresponding to the lying-down position of the seat by virtue of guiding means such as, for example, rotatory (joint, pivot, axis, etc.) guiding means and/or translatory (rails, jacks, etc.) guiding means.

In a preferred embodiment, the back is a component element of the level surface intended to accommodate the passenger in lying-down position.

In this embodiment, the seat advantageously comprises guiding means making it possible, at the time of changeover of the seat from the seated position to the lying-down position, to guide the back in such manner that the back comes to cover most of the position of the sitting portion in its seated position. The back in lying-down position then, for example, covers the sitting portion, and a selected edge of the back in lying-down position in the whole comprising the base of the back and its free end preferably is more or less superposed on one edge of the sitting portion.

Said guiding means make it possible, at the time of changeover of the seat from the seated position to the lying-down position, to guide the back according to a movement which advantageously is a combination of a longitudinal translation and a rotation around a more or less transverse horizontal axis.

These guiding means comprise, for example, on both sides of the frame, at least one guiding rail so as to guide the base of the back, at the time of changeover from the seated position to the lying-down position, from the position corresponding to the rear of the sitting portion in seated position to a position corresponding to the front of the sitting portion in seated position.

In a variant embodiment, these guiding means comprise on both sides of the frame at least one guiding rail so as to guide the base of the back, at the time of changeover from the seated position to the lying-down position, from the position corresponding to the rear of the sitting portion in seated position to a drawn-back position such that when the base of the back is in this drawn-back position, the free end of the back is in a position corresponding to the front of the sitting portion in seated position.

A preferred embodiment provides that the back of the seat according to the invention is joined to a fixed portion of the seat by means of two levers located on both sides of the sitting portion, that each lever is assembled pivoting around an axis more or less horizontal and transverse in relation to said fixed portion, and that the back is assembled pivoting around a more or less horizontal transverse axis between the two levers. This embodiment makes possible easy handling of the back to change it from its more or less vertical position to its more or less horizontal position or conversely. In addition, this technical solution is simple and low in cost price. The sitting portion is, for example, fastened to the frame, thus constituting a fixed portion of the seat, and the levers then can be assembled on the lateral sides of the sitting portion. In order to follow the shape of the seat and not to form a protruding part, in particular when the seat is in seated position, the levers advantageously have an L shape. In order to facilitate pivoting of the back, the two levers advantageously are joined by a plate. The latter makes it possible to rigidify the movable whole comprising the back. For each lever, the distance between the axis of pivoting of the lever in relation to said fixed portion and the axis of pivoting of the back ranges, for example, between half and three-quarters of the length of the sitting portion, in the longitudinal direction.

In these different embodiments described above, there preferably are provided clamping and/or locking means which hold the back in its turned-up position when the seat is in its so-called seated position.

In the case in which the back is used to form the level surface intended to accommodate the lying-down passenger, the additional berth cooperating with the back to form a level surface comprises, for example, a shelf capable of moving between a more or less horizontal position as a continuation of the back toward the front when the seat is in lying-down position and a more or less lateral vertical position in the seated position. The more or less level bedding surface then can be made up of the back in more or less horizontal position and said movable shelf. On the other hand, in a variant in lying-down position, said movable shelf cooperates, for example, with the back and a unit arranged facing and at a distance from the frame and the height of which corresponds more or less to that of the sitting portion of the seat.

An embodiment of a seat according to the invention provides that the sitting portion is assembled pivoting around a transverse axis located close to its front edge so as to be able to pivot approximately 180° and then be more or less the continuation of the back in lying-down position. In this embodiment, the means cooperating with the back to form a level surface comprise, for example, the pivoted sitting portion as well as a unit arranged facing and at a distance from the frame and the height of which corresponds more or less to that of the sitting portion of the seat.

Another embodiment provides that it comprises a footrest assembled pivoting around a transverse axis located close to its front edge so as to be able to pivot approximately 90° and then be more or less the continuation of the back in lying-down position. The means cooperating with the back to form a level surface then comprise, for example, the pivoted footrest as well as a unit arranged facing and at a distance from the frame and the height of which corresponds more or less to that of the sitting portion of the seat.

Said unit also can comprise a movable flap capable of pivoting approximately 180° around a more or less transverse horizontal axis so as to form an additional berth.

An advantageous variant provides that the back incorporates an additional berth. The latter is assembled, for example, sliding, or else pivoting, in relation to the back.

There also may be provided scenarios in which the back is turned down but does not cover the sitting portion. Such a case is, for example, the case in which the convertible seat comprises guiding means making it possible, at the time of changeover of the seat from the seated position to the lying-down position, to guide the back according to a movement which is the combination of a longitudinal translation and a rotation around a more or less transverse horizontal axis, such that the back and the sitting portion are the continuation of one another, the base of the back being situated facing the front transverse edge of the sitting portion. The additional berth then, for example, is a fixed part assembled on the frame at the rear of the sitting portion and the continuation thereof.

The invention also relates to the embodiments in which the level surface intended to accommodate a lying-down passenger does not comprise the back. Such a seat according to the invention comprises, for example, guiding means making it possible, at the time of changeover of the seat from the seated position to the lying-down position, to guide the back according to a movement which is the combination of a longitudinal translation toward the rear and a rotation around a more or less transverse horizontal axis such that the back in the lying-down position of the seat is more or less perpendicular to the plane of the sitting portion of the seat. The back then is put "out of the way" and stored vertically, leaving the space available for implementing the bedding surface with other elements. The level surface intended to accommodate a passenger in lying-down position then comprises, for example, the sitting portion of the seat, a fixed portion assembled on the frame at the rear of the sitting portion and as a continuation of the latter, as well as a shelf capable of moving between a more or less horizontal position as a continuation toward the front of the sitting portion in the lying-down position and a more or less lateral vertical position in the seated position.

This invention relates very particularly to a convertible seat such as described above and characterized in that it further comprises a lateral wall surrounding in particular the back of the seat.

In such a seat, a luggage compartment advantageously is provided between the lateral wall and the seat frame. This luggage compartment preferably comprises a lateral door which can be a door sliding in a more or less vertical plane with the aid of a more or less horizontal guiding rail borne by the lateral wall.

This invention also relates to a module comprising a seat as well as a wall surrounding the seat at least partially, characterized in that the seat is a seat such as described above.

Finally, it relates to an aircraft intended for the transport of passengers comprising a convertible seat such as described above.

BRIEF DESCRIPTION OF THE DRAWINGS

Details and advantages of this invention will emerge more clearly from the description which follows, presented with reference to the attached schematic drawing, on which.

DETAILED DESCRIPTION OF THE PREFERRED EMBODIMENTS

Figure 1:
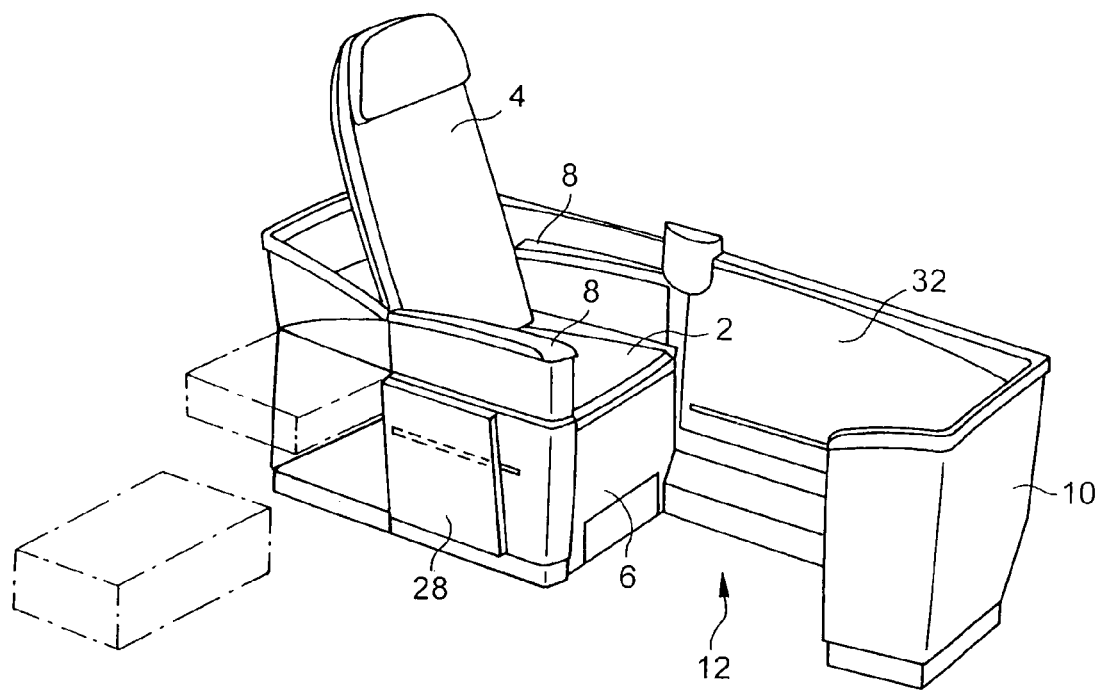
FIG. 1 represents a seat according to the invention in its configuration to accommodate a passenger in seated position, FIGS. 2 and 3 schematically show the seat of FIG. 1 when it is in intermediate positions between its so-called seated position and its so-called lying-down position, FIG. 4 schematically shows the seat of FIG. 1 converted into a bed.

FIG. 1 shows a first embodiment of a seat according to the invention. This seat comprises a sitting portion 2, a back 4 and a footrest 6. On each side of the sitting portion 2 there also is an armrest 8, in each case.

This seat is intended to accommodate an aircraft passenger and to be fastened on the floor of an aircraft cabin. This seat is more particularly intended for a first-class compartment of an aircraft or else possibly for a business-class compartment. Then to clearly define the space given to the passenger traveling in the seat, a wall 10 surrounds this space. It is understood that the seat is located within this space and an opening 12 implemented in the wall 10 allows access to the interior of this space and to the seat. This wall 10 has, for example, a height of approximately 80 cm, which corresponds more or less to the height of the armrests 8. Thus an individual seated in the seat can chat with a neighboring individual and be relatively well isolated from the other travelers when the seat is converted into a bed. It is understood, however, that a different height can be chosen.

Figure 2:
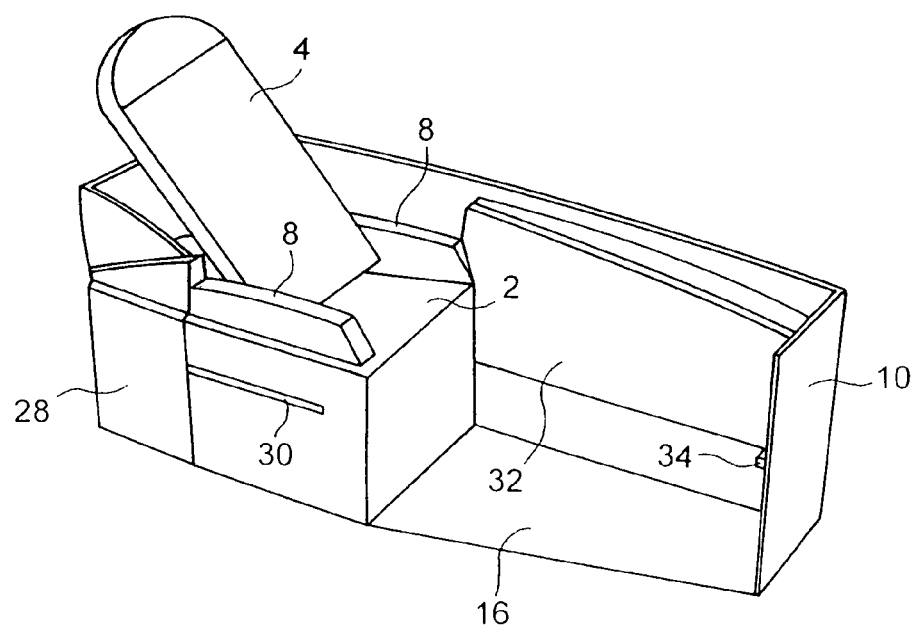
Figure 3:
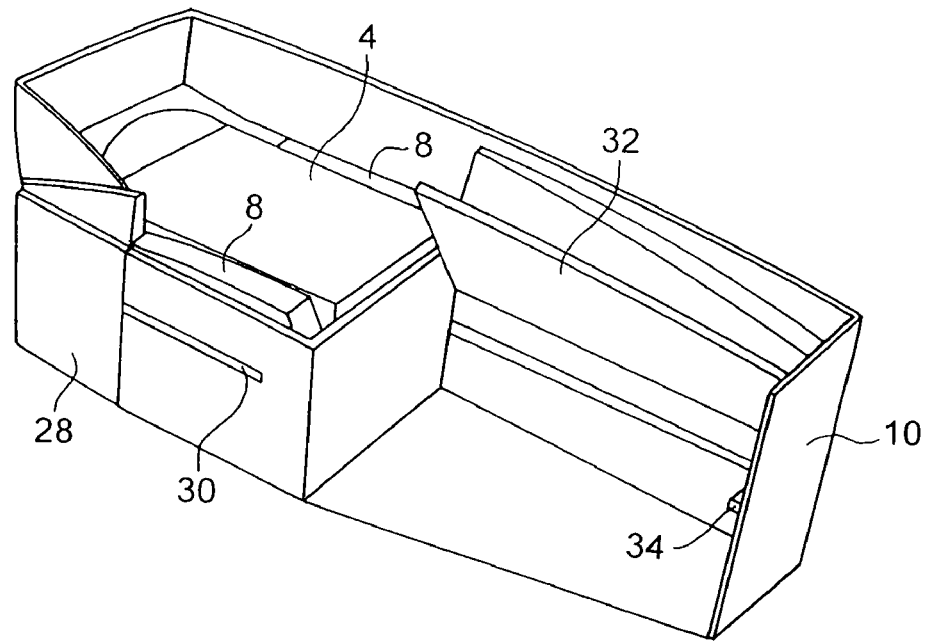

FIG. 1 shows the seat in a so-called seated position in which it is intended to accommodate a passenger traveling in seated position. FIGS. 2 and 3 show intermediate positions of the seat of FIG. 1 prior to reaching the so-called lying-down position illustrated in FIG. 4. In the latter position, the seat has a more or less level bedding surface intended to accommodate a passenger in lying-down position.

Figure 4:
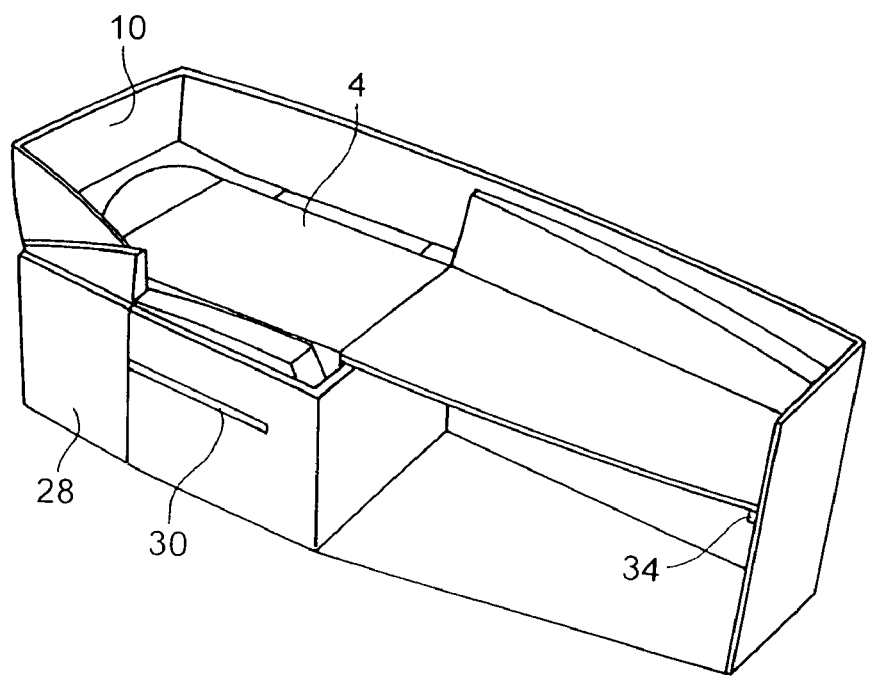

FIGS. 5a to 5e illustrate the changeover of the back 4 from its more or less vertical turned-up position corresponding to the seated position of the seat (FIG. 1) to its more or less horizontal extended position corresponding to the lying-down position of the seat (FIGS. 3 and 4). These FIGS. 5 illustrate only the armchair accommodating the passenger in seated position and not all the components of the seat also allowing it to be converted into a bed.

FIGS. 5a to 5e make it possible to better perceive the structure of the seat itself. The latter comprises a frame 14 having four legs for attachment thereof to the floor. This attachment is implemented, for example, in a manner standard in the field of aviation. In aircraft cabins, provision usually is made to incorporate into the floor 16 longitudinal rails (not illustrated) distributed over the entire width of the cabin and extending over more or less the entire length thereof. These rails have regularly spaced anchoring points, generally with a distance of 2.54 cm, or one inch. Each leg of the frame 14 then comes to be attached in known manner to an anchoring point of such a rail.

In the course of the description, it is considered that the space is oriented as perceived by a passenger seated (or lying down) in the seat. The floor 16 of the cabin therefore is down below and is horizontal, while the seat is above the floor. The back 4, in the seated position of the seat, is at the rear of the seat. The armrests 8 are arranged longitudinally and are to the right and left of the sitting portion 2.

The frame 14 has a framework connecting the legs at a distance from the floor. The sitting portion 2 of the seat is integrally attached to this framework. The rear legs of the frame 14 extend upward above the framework to serve as a support for the armrests 8.

As for the back 4, it has pins 18 assembled at the end of legs 20. The pins 18 are guided in grooves 22 implemented on the frame 14, on the longitudinal edges of the framework. The back 4, in the seated position of the seat, has a base 24 located down below at the level of the sitting portion 2 and a free end situated on the opposite side of the base 24 and bearing a headrest 26. The legs 20 each on the one hand are attached to the base 24 of the back 4 and on the other hand bear a pin 18 at their free end. Each pin 18 extends more or less horizontally crosswise in relation to the seat. Two legs 20 are located on each side of the back 4 and more or less form a V the free ends of which each bear a pin 18. The grooves 22 are implemented on a more or less vertical plate, one plate being arranged to the left of the sitting portion 2 and another to the right thereof. Clamping and/or locking means are provided to hold the pins 18 in a given position in the corresponding groove 22. These clamping and/or locking means possibly are remote controlled, for example by a lever arranged at the front end of an armrest 8.

Figure 5A:
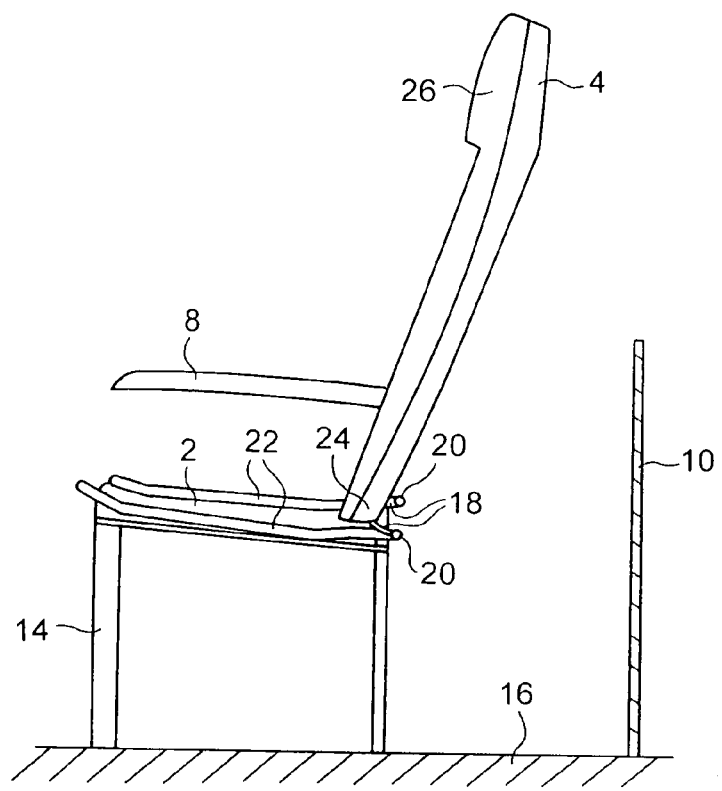
FIGS. 5a to 5e are schematic side views showing the movement of the back of the seat of FIGS. 1 to 4 during changeover from the position of FIG. 1 to that of FIG. 3, FIGS. 6a to 6d, 7a to 7d, 8a to 8d, 9a to 9d, 10a to 10d, 11a to 11d and 12a to 12d schematically show seven distinct embodiments of a convertible seat according to the invention, respectively in seated position, in a first intermediate position, in a second intermediate position and in the lying-down position, and FIGS. 13a to 13c schematically show in side view a preferential embodiment of an armchair intended for a seat according to the invention in a first seated position, in a second seated position with the back inclined toward the rear and in a lying-down position.

FIG. 5a shows the back 4 in its turned-up, more or less vertical position corresponding to the seated position of the seat. The pins 18 then abut on the rear of the corresponding grooves 22.

Figure 5B:
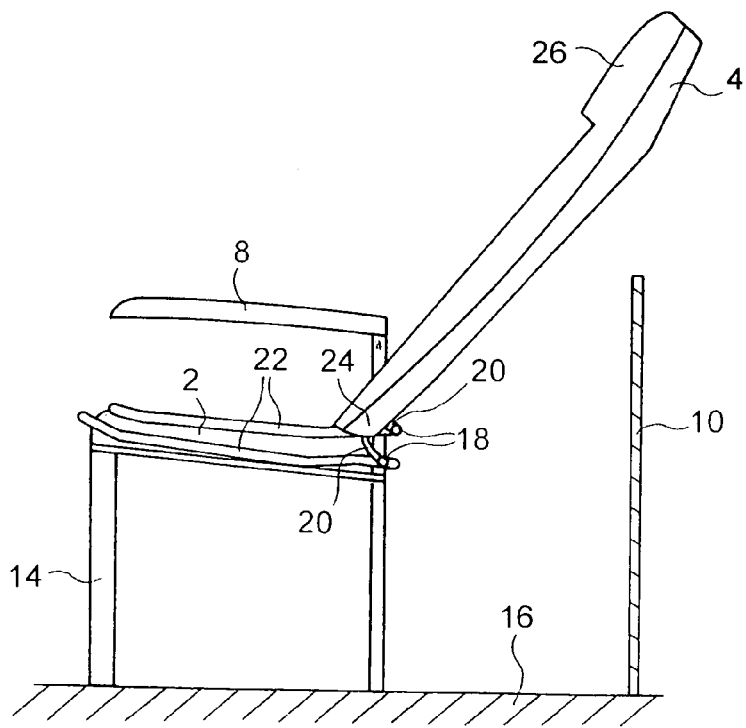

FIG. 5b shows the back 4 when the latter is starting to tilt to approach the horizontal position. In this first movement, the back pivots around the axis defined by the two upper pins 18. The latter abut on the bottom of the groove 22 and the lower pins 18 move toward the front in the lower grooves 22.

Figure 5C:
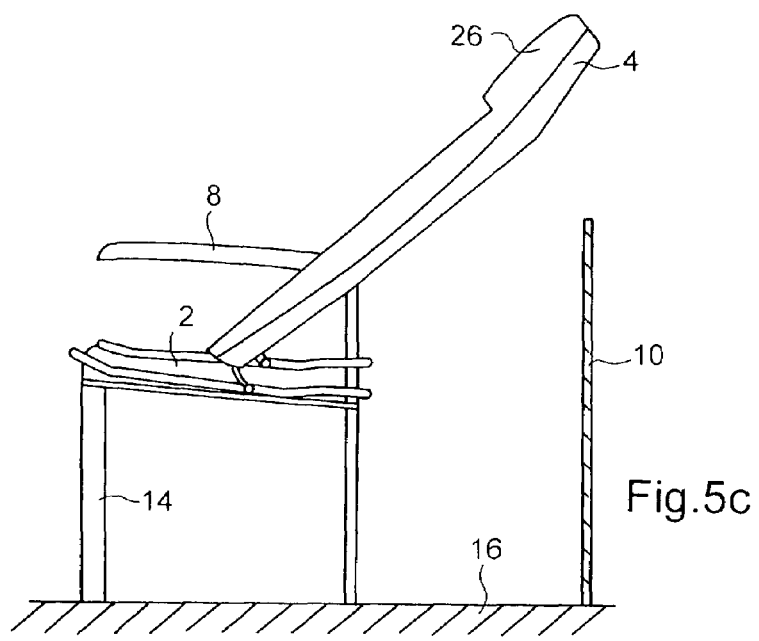
Figure 5D:
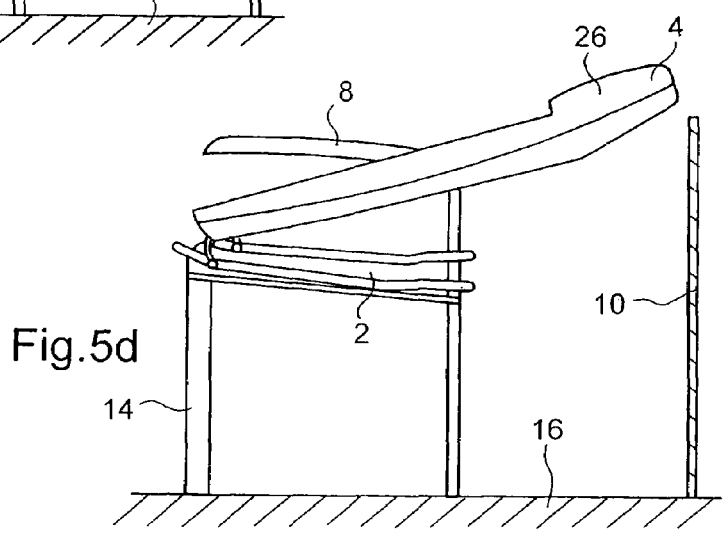

After this first pivoting movement, the back 4 advances toward the front of the seat in an essentially translatory movement (FIG. 5c). The base 24 of the back 4 then approaches the front of the sitting portion 2.

Figure 5E:
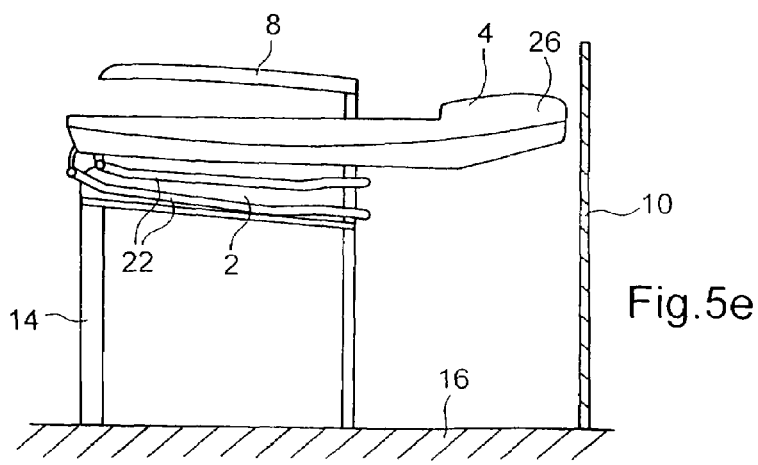

When the base 24 of the back 4 comes close to the front of the sitting portion 2 (FIG. 5d), the translatory movement of the back toward the front is combined with a rotation so as to bring the back 4 into a more or less horizontal position as illustrated in FIG. 5e.

It is noted in these FIGS. 5 that the movement of the back 4 takes place without being hindered by the wall 10. The frame 14 and the wall 10 are arranged in relation to one another such that in the more or less horizontal extended position of the back 4, on the one hand the headrest 26 is close—at most a few centimeters away—to the wall 10, and on the other hand, the base 24 of the back is more or less above the front transverse edge of the sitting portion 2.

Given that the height of the back 4 is greater than the length of the sitting portion 2, when the conditions of the preceding paragraph are satisfied, a space then remains between the frame 14 which is beneath the sitting portion 2 and the wall 10. This space advantageously can be used for the storage of luggage. Thus there is noted in FIGS. 1 to 4 the presence of a sliding door 28 on the wall 10, arranged at the level of the floor 16 of the cabin and at the rear of the seat, to allow access to and closing of this storage space. A horizontal guiding rail 30 is, for example, provided in the wall 10 to allow sliding of this door 28.

The presence of such a storage space behind the seat is very advantageous. As a matter of fact, the storage volume made available in this way is greater than the volume customarily provided per passenger in an aircraft cabin. Furthermore, this layout of a luggage compartment behind the seat and on the floor 16 entails practically no additional weight, as is the case when luggage compartments are set up overhead in an aircraft cabin.

The changeover of the back 4 to the horizontal position does not make it possible to accommodate a passenger in lying-down position. Additional means then are provided to cooperate with the back 4 in horizontal position in order to create a bedding surface capable of comfortably accommodating a man in stretched-out position. FIGS. 3 and 4 show these additional means and illustrate their implementation.

An additional berth 32 is provided inside the wall 10. When a passenger is traveling seated in the seat, this additional berth 32 is stored vertically along the wall 10, inside the latter, in front of the frame 14. This additional berth 32 has a level surface complementary to the surface of the back 4 to form a full berth capable of accommodating a passenger.

This berth 32 could be simply an element independent from the rest of the seat and from the wall 10 which would be held, for example, with the aid of straps when it is stored vertically along the wall 10 and which would be undone in order to place it in horizontal position to cooperate with the back in horizontal position to form a berth.

It is preferable, however, to provide guiding means to facilitate the changeover of the additional berth 32 from its vertical stored position to its horizontal "service" position. Thus, for example, a more or less horizontal axis can be provided at the bottom of the additional berth 32 when the latter is in vertical stored position along the wall. This axis then is engaged in a more or less vertical guiding groove on the one hand on the seat side, for example the groove can be implemented on a front leg of the frame 14, and on the other hand on the wall 10 side facing the seat. Then when the axis of the additional berth 32 abuts in the high position, or else even during movement of this axis in the corresponding grooves, the additional berth 32 is pivoted (cf. FIG. 3) to assume a horizontal position (cf. FIG. 4). This additional berth 32 is held in this horizontal position by resting on the front transverse edge of the sitting portion 2 as well as on a ledge 34 implemented on the inner surface of the wall 10 opposite the seat.

In standard manner, the seat according to the invention also can comprise a footrest 6 as in the embodiment illustrated in FIG. 1. This footrest 6, for example, can be tilted to support the legs of a passenger traveling in seated position and to enhance his comfort. Such a footrest is not described in further detail here because, on the one hand, it is known to the individual skilled in the trade, and on the other hand, in this described embodiment it is not involved in the conversion of the illustrated armchair into a berth.

It is noted in FIGS. 3 and 4 that the armrests 8 are in a lowered position in relation to the position of FIG. 1. In this way, the passenger traveling lying down is not made uncomfortable by these armrests 8 which also can be used to increase the bedding surface.

The convertible seat so implemented can have a mass appreciably smaller than the mass of the convertible seats which are found in present-day aircraft. This is achieved in particular by virtue of the fact that the frame 14 is a fixed frame which does not move. This seat therefore is of a completely innovative design. As a matter of fact, in the prior art, an armchair is converted into a berth by placing one next to the other, in more or less the same plane, the back of the armchair, its sitting portion and its footrest. In order then to be able to be converted into a bed, while remaining in a quite restricted given defined space, it then is preferable in the art prior to the invention to move the sitting portion of the armchair. The proposed solution described hereinabove does not require any movement of the sitting portion. In comparison with the convertible seats of the prior art, it involves an additional element, the addition berth 32, and although it has this additional element, the total mass can be considerably smaller than the mass of a standard convertible aircraft seat.

In addition to the very significant advantage as relates to the seat mass, the solution proposed above has another significant advantage as relates to storage of luggage traveling in the cabin. This solution makes it possible to eliminate the luggage compartments which usually are found overhead in aircraft cabins, which provides a further advantage in terms of mass. Another advantage is to make it possible to have a considerably greater feeling of space in the aircraft cabin. In addition, the luggage is easier to store, since it becomes unnecessary to pick it up to lift it into a compartment: it suffices to slide it on the floor, which is considerably more ergonomic. Finally, as the luggage is stored at floor level, there is no risk of its falling down when the luggage compartment is opened.

FIGS. 6 to 12 show the variant embodiments of a convertible aircraft seat according to the invention, which also offers numerous advantages in relation to the convertible seats of the prior art.

The seats and other elements illustrated in FIGS. 6 to 12 also can be surrounded by a wall 10 such as that shown in FIGS. 1 to 5. This wall preferably is provided for all these embodiments in order to define the space given to a passenger. Nonetheless, to prevent this wall from concealing portions of the seat, it is not illustrated on these Figures in order to better show the conversion of the seat into a berth.

In the embodiment of FIG. 6, the back 4 also cooperates with an additional berth 32, which can be identical to the one of the preceding Figures and which therefore bears the same reference, to form a berth. The difference here is the direction of pivoting of the back 4 to change from its more or less vertical position to its horizontal position. Whereas in the first embodiment described previously, the back 4 was pivoted such that its front surface in the seated position becomes the upper surface in lying-down position, in this second embodiment, it is the rear surface of the back 4 in seated position which becomes the upper surface in lying-down position.

Figure 6A:
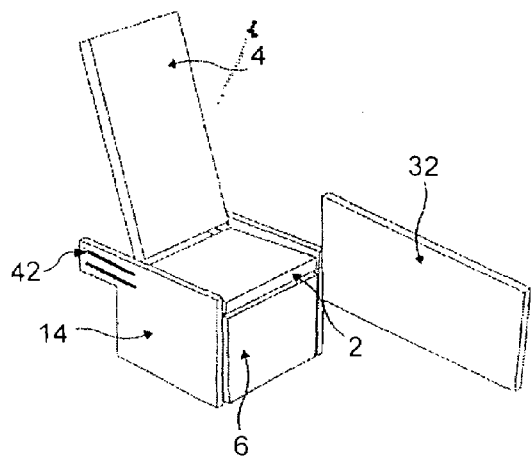
Figure 6B:
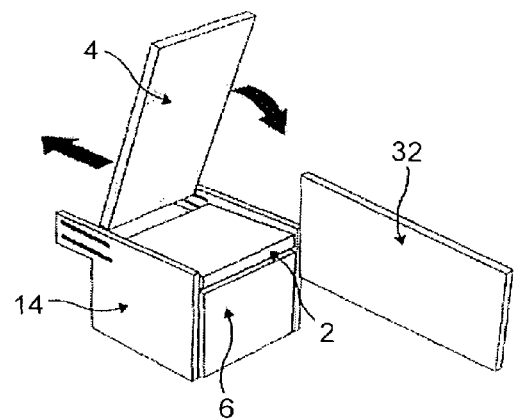

In order to accomplish this new pivoting and translatory movement symbolized by black arrows in FIG. 6b, grooves 42 are provided. Like the grooves 22, they are implemented laterally on the frame 14. Instead of being more or less at the height of the sitting portion 2, however, they are behind the latter. The grooves 42 thus make it possible to guide the base of the back 4 in translation toward the rear at the same time that the back 4 pivots to fold down on the sitting portion 2.

Figure 6C:
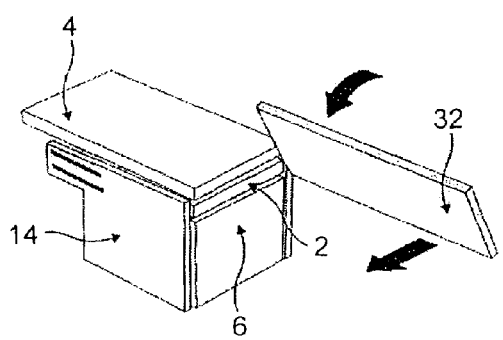
Figure 6D:
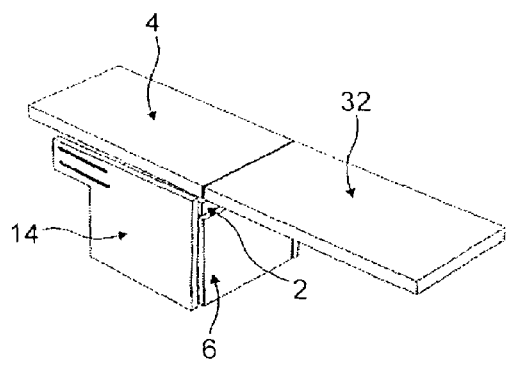
Figure 7A:
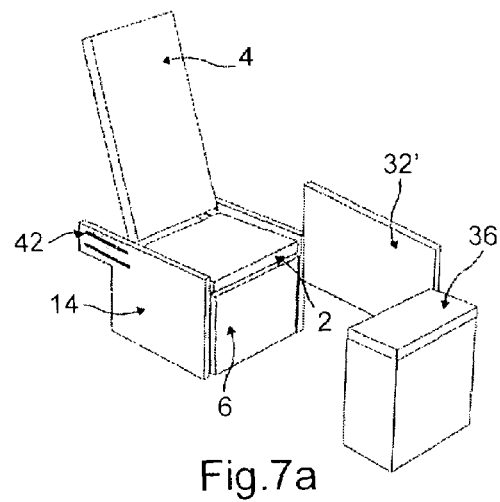
Figure 7B:
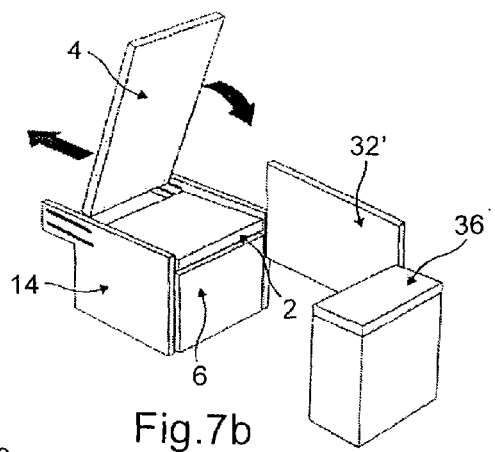
Figure 7C:
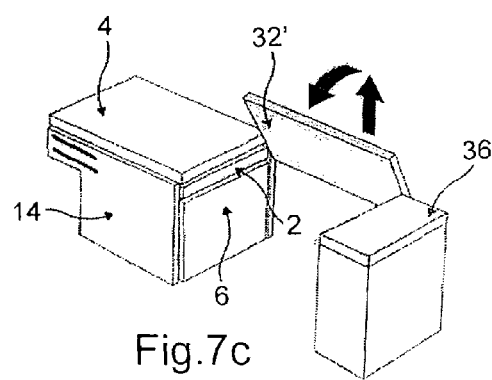
Figure 7D:
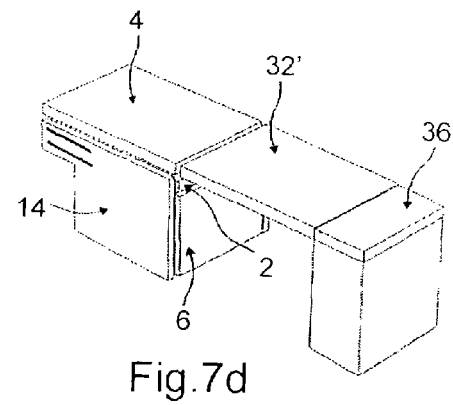
Figure 8A:
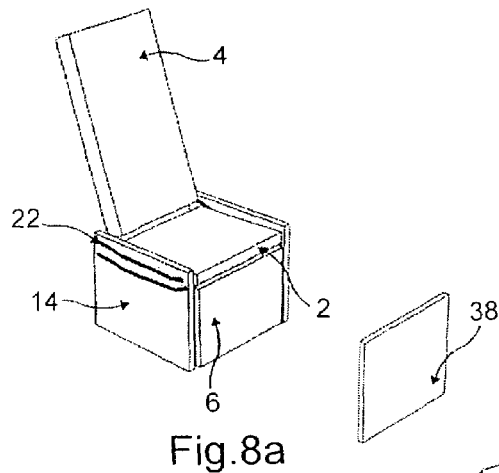
Figure 8B:
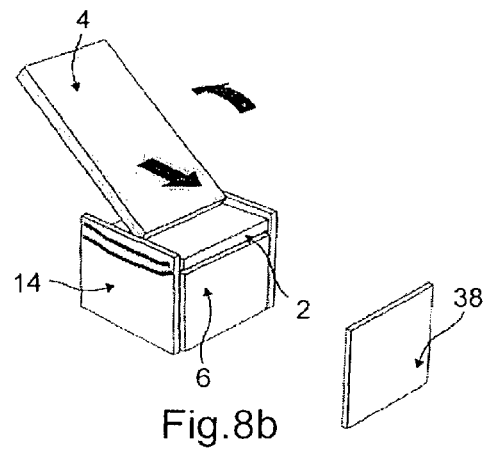
Figure 8C:
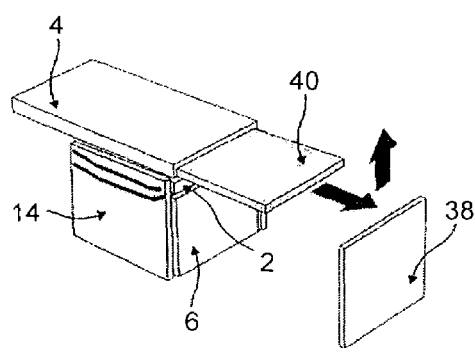
Figure 8D:
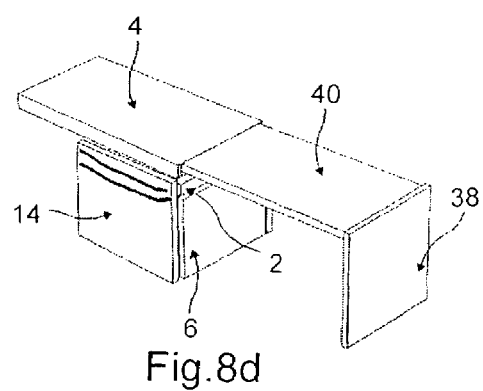
Figure 10A:
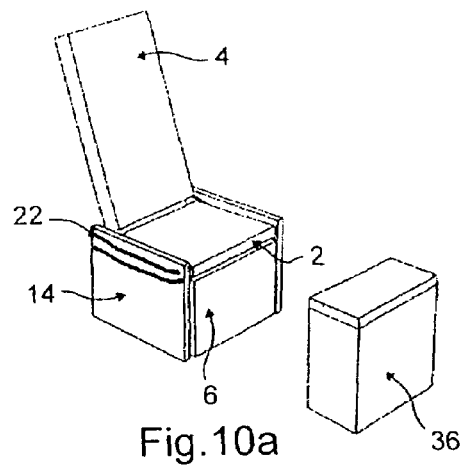
Figure 10B:
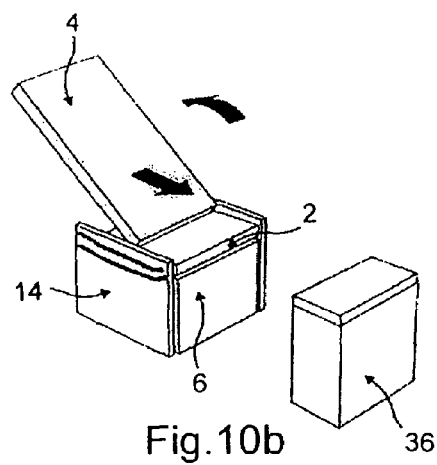
Figure 10C:
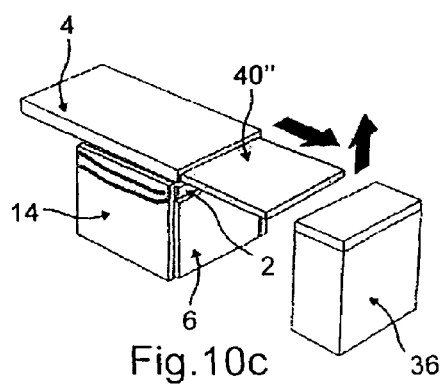
Figure 10D:
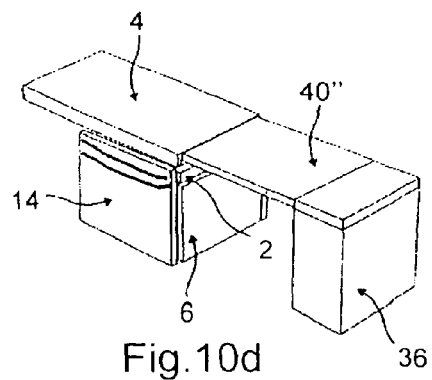
Figure 11A:
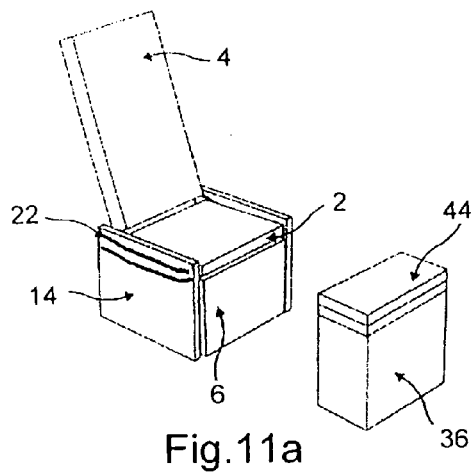
Figure 11B:
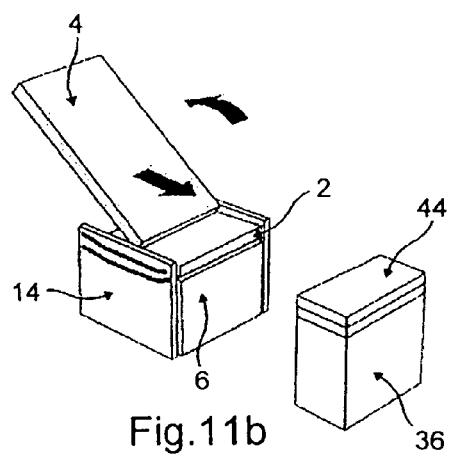
Figure 11C:
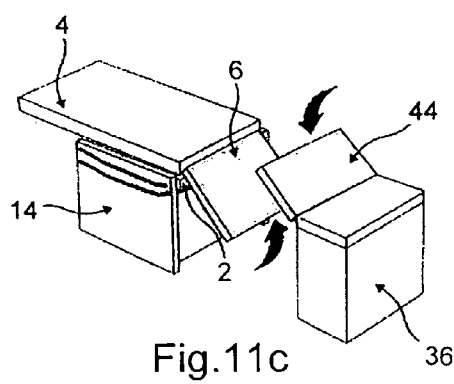
Figure 11D:
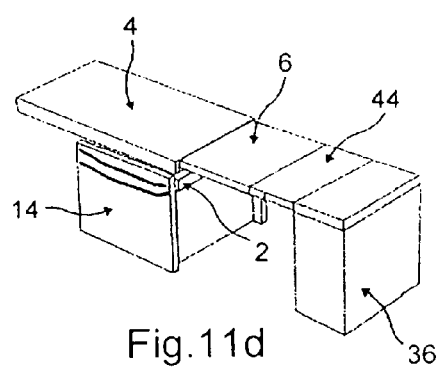
Figure 12A:
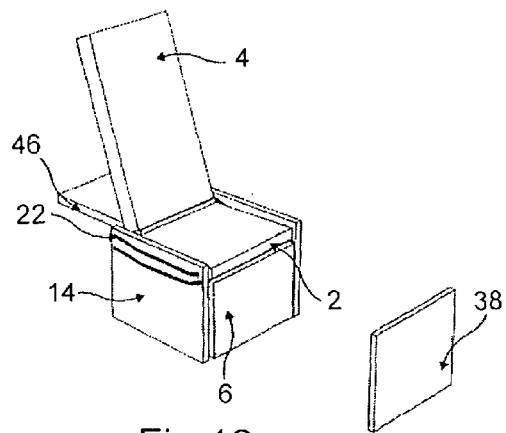
Figure 12B:
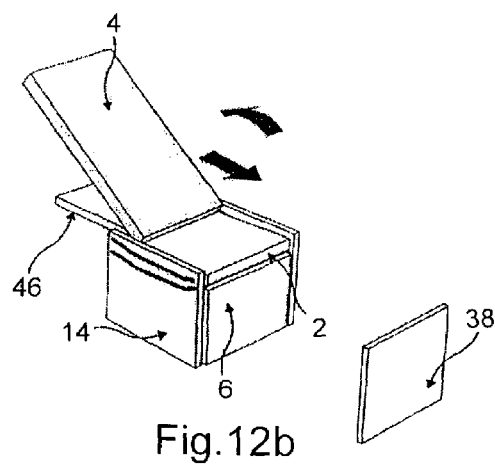
Figure 12C:
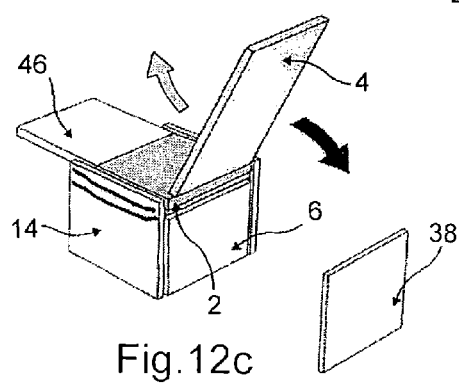
Figure 12D:
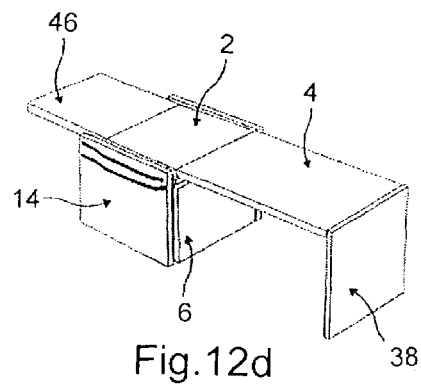

Once the back 4 is folded down, there is seen again the same additional berth 32 as in the first embodiment, which is translated upward and pivots—black arrows in FIG. 6c—to form a more or less level bedding surface. The additional berth 32 here also rests, for example, on a ledge such as the ledge 34 of the preceding Figures, but which has not been illustrated here.

In the variant embodiment of FIG. 7, the back 4 takes up the same movement as in the embodiment of FIG. 6 and is guided by grooves 42 to change from the more or less vertical turned-up position to the more or less horizontal position.

In this embodiment, the passenger has facing him a unit 36 which can have several functions. It can serve simply as a seat in the event that this passenger wishes to welcome another passenger and chat with him. This unit 36 also can serve as storage, for example, for a comforter and a pillow which are used when the seat forms a berth. It also can serve to house a television or computer screen. All these functions are given by way of nonrestrictive example.

This unit 36 has an upper portion which is more or less at the same height as the back 4 when the latter is in horizontal position. To then form a berth when the back 4 is turned down horizontally, provision is made to use an additional berth 32', similar to the additional berth 32 of the preceding Figures. Nonetheless, considering the presence here of the unit 36 and the upper portion thereof, the additional berth 32' however, is of reduced size in relation to the additional berth 32 described previously. This additional berth 32' of reduced size also is stored vertically between the armchair and the unit 36 and changes from its vertical stored position to its horizontal "active" position by translation and pivoting, as illustrated by the two black arrows of FIG. 7b. Here also an axis can be provided for pivoting. There also can be provided merely two grooves, one on the side of the frame 14 of the seat and the other on the side of the unit 36 for storage of the additional berth 32'. In horizontal position, the additional berth 32' thus comes to rest on the sitting portion 2 and the unit and forms a more or less level berth with the turned-down back 4 and the upper portion of the unit 36.

In the embodiment of FIG. 8, the back 4 changes from its more or less vertical turned-up position to its horizontal position in the same manner as for the embodiment of FIGS. 1 to 5.

In this fourth embodiment of a seat according to the invention, there also again is seen an additional berth 40. In original manner, this additional berth 40 is stored in the back 4. It has more or less the same length as the back 4 and a slightly lesser width.

The back 4 can be hollow, for example, and thus have a tubular rectangular section shape, possibly closed at the end opposite the base of the back 4. The additional berth 40 then is housed in the cavity of the back.

The back 4 also can have a U-shaped section. The base of the U forms the front surface of the back 4 when the latter is in turned-up position, that is, the surface against which the passenger leans when he is sitting in the seat. The two branches of the U then form a runner in which the additional berth 40 slides.

Once the additional berth 40 has been brought outside the back 4, it is advisable to position it at the same level as the back 4 by a translation of a few millimeters, or centimeters, upward. For this purpose, there can be provided a mechanism similar, for example, to that used to extend a table. Extension pieces then are stored under the top of the table and are made to slide in order to bring them out, and ultimately the extension is positioned on the same level as the top of the table. Here furthermore, considering the significant slant, provision also is made to support the free edge of the additional berth 40. A support 38 thus is positioned facing the armchair. It is in the form of a vertical wall facing the armchair. Sustaining lugs (not illustrated), for example, are provided on the surface of the support 38 located on the side of the armchair to accommodate and hold the free end of the additional berth 40.

The fifth embodiment illustrated in FIG. 9 is a variant embodiment of the fourth embodiment. There is seen again the same movement of the back 4 to change from the more or less vertical turned-up position to the more or less horizontal position, and an additional berth 40' is incorporated into the back 4.

Here the additional bed 40' is assembled pivoting in relation to the back 4. It thus suffices to provide a hinge at the base of the back 4 between the latter and the additional berth 40' to bring the latter into horizontal position. To convert the seat into a bed, the back 4 therefore is brought into its more or less horizontal position as shown in FIGS. 9a and 9b, then the additional berth 40' is pivoted in order to double the bedding surface obtained with the back 4 placed in horizontal position. Here also, considering the significant slant, the additional berth 40' is held with the aid of a support 38 advantageously equipped with sustaining lugs.

In the embodiment of FIG. 10, the back 4 changes from its more or less vertical turned-up position to its more or less horizontal position in the same manner as for the first embodiment shown in detail in FIGS. 1 to 5. The same as for the embodiments of FIG. 7, a unit 36 facing the armchair is seen again here.

This embodiment is a variant of the embodiment of FIG. 8. In fact, there is seen again here an additional berth 40" incorporated into the back 4 and sliding in relation thereto. By virtue of the presence of the unit 36, the additional berth 40" is of reduced size in relation to the additional berth 40 of FIG. 8. The changeover of the seat from the seated position to its lying-down position takes place as for the embodiment of FIG. 8. At the end of conversion, the berth then is formed here from the back 4, the additional berth 40" and the upper portion of the unit 36, whereas for the embodiment of FIG. 8, the berth comprises only two parts: the back 4 and the additional berth 40.

The seventh embodiment of a seat according to the invention proposed here is developed, for example, from the preceding embodiment. In fact, there again is seen a similar back 4 guided by grooves 22 for the changeover into its horizontal position and the presence of a unit 36 facing the armchair.

The bedding surface comprises the back 4 brought into horizontal position and the upper portion of the unit 36. This does not suffice to accommodate a passenger in lying-down position and it is advisable to fill in the space between the back 4 in horizontal position and the unit 36. In this embodiment, the invention proposes using the footrest 6 as is done in standard manner in the convertible seats of the prior art, bringing this component of the armchair into a more or less horizontal position, as a continuation of the back 4. It also proposes dividing the upper portion of the unit into a fixed part and a flap 44 joined to the fixed part by means of a hinge, arranged on a transverse edge of the fixed part, on the armchair side.

The berth thus implemented is made up of four elements: the back 4, the footrest 6, the flap 44 and the fixed upper portion of the unit 36.

In the eighth embodiment of a seat according to the invention proposed by this description (FIG. 12), the back 4 of the seat first of all changes from its more or less vertical turned-up position into a more or less horizontal position in the same manner as for the embodiments of FIGS. 1-5 and 8-11. Once it is in this position, the entire back 4 pivots 180° around a transverse axis more or less corresponding to the front transverse edge of the sitting portion 2. A support 38 with sustaining lugs for accommodating and supporting the back 4 again is seen facing the armchair.

This seat also comprises an additional fixed berth 46 which is more or less on the same level as the sitting portion 2 and which is a continuation of same toward the rear. When the seat is surrounded by a wall such as the wall 10 of FIGS. 1 to 5, this additional fixed berth 46 preferably extends until reaching this wall 10. In this manner, the bedding surface offered to the passenger is as large as possible, taking into consideration the dimensions of the wall 10.

Like FIGS. 5a to 5e, FIGS. 13a to 13c show an armchair of a convertible seat according to the invention. For the sake of simplicity and clarity, for the armchair only the sitting portion, the back and the guiding means for the latter have been illustrated in these Figures.

Figure 13A:
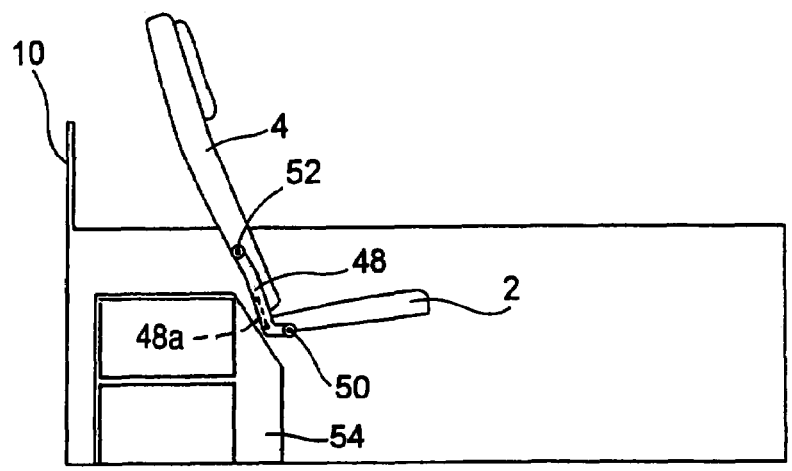
Figure 13B:
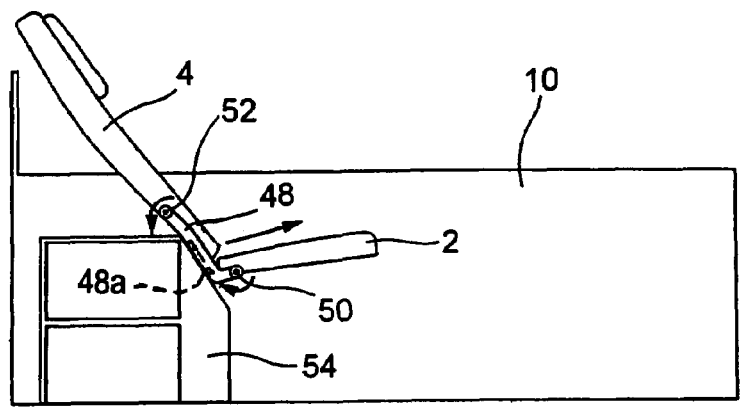
Figure 13C:
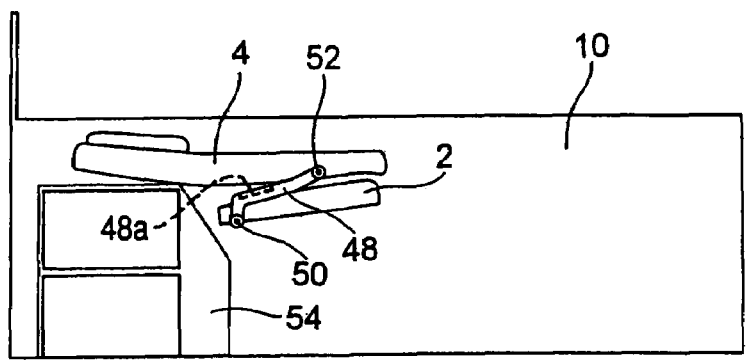

In this embodiment, the sitting portion 2 of the armchair remains fixed. The back 4 is joined to the sitting portion 2 by means of two levers 48. In FIGS. 13a to 13c, only the right lever is visible, the other lever 48 being concealed. This left lever 48 is similar to the lever visible in the drawing. As can be seen, each lever has a general L-shape.

Each lever 48 is assembled pivoting on the one hand in relation to the sitting portion 2 and on the other hand in relation to the back 4. Each lever 48 is assembled pivoting around a transverse horizontal axis 50, arranged laterally at the rear of the sitting portion 2. In pivoting around this axis 50, each lever 48 remains in a more or less vertical plane. The axis 50 traverses the lever 48 at its free end corresponding to the small branch (horizontal) of the L.

The back 4 is assembled between the two levers 48. The joint between each lever 48 and the back 4 is formed by a transverse horizontal axis 52. The two levers 48 are joined, for example, by a plate 48a which extends to the rear of the back 4 in seated position. This plate extends, for example, over all or part of the height of the large branch (vertical) of the levers 48. It makes it possible, by rigidifying the movable whole comprising the seat, to facilitate the movement of this whole in relation to the sitting portion 2.

In the position illustrated in FIG. 13a, the armchair is in a normal seated position. In FIG. 13b, the back 4 is tilted toward the rear in relation to the position of FIG. 13a. In order to change from the position illustrated in the latter Figure to the position of FIG. 13b, the two levers each pivot around their axis 50. The two positions of the levers 48 illustrated in these two FIGS. 13a and 13b are, for example, indexed.

In the positions illustrated in FIGS. 13a and 13b, the levers 48 are locked on their axes 50 and the back 4 is locked in relation to the axes 52. The locking means used here are not illustrated in the drawing. Such locking means are known to the individual skilled in the trade.

In order to change from the position illustrated in FIG. 13a or that of FIG. 13b to the position illustrated in FIG. 13c, it is well to have the levers 48 pivot in the direction of the arrow shown next to axis 50 and to have the back 4 swing in the direction of the arrow shown near the axis 52. In this movement, the bottom of the back 4, that is, the portion of the back in seated position near the sitting portion 2, moves more or less along the upper surface of the sitting portion 2. This movement is illustrated by a third arrow above the sitting portion 2.

There have been illustrated in FIGS. 13a and 13c, on the one hand a wall 10 surrounding the seat corresponding to the sitting portion 2 and to the back 4 illustrated and as visible in FIGS. 1 to 5, and on the other hand a luggage compartment 54. This luggage compartment 54 occupies space at the rear of the illustrated armchair, between the frame (not illustrated) thereof and the wall 10. Such a luggage compartment 54 then can accommodate two bags of the size usually allowed in the cabin of an airplane.

As illustrated in FIGS. 13b and 13c, this luggage compartment 54 also can serve as a support for the back 4 of the illustrated armchair. In the embodiment depicted, the luggage compartment 54 has a cut-off corner in its upper portion on the armchair side. The slant of this cut-off corner corresponds to the slant of the back in its seated position tilted toward the rear (FIG. 13b). The bottom of the back 4 thus can come to rest against this slanted corner which also serves as a stop for the levers 48. In FIG. 13c, the back 4 is in more or less horizontal position and it comes to rest on the upper portion of the luggage compartment 54.

In this preferred embodiment, the distance separating the axes 50 and 52 on the same side is slightly greater than half the length of the sitting portion 2. In this manner, it is possible to move the bottom of the back, at the time of changeover from a seated position to the lying-down position, for a distance corresponding more or less to the length of the sitting portion 2. This distance separating the axes is dependent, of course, on the position of these axes. It also possibly depends on the thickness of the sitting portion and of the back. In a variant embodiment, arranging the axes 50 not at the level of the sitting portion 2 but at the level of the frame (not illustrated on FIGS. 13a to 13c) of the armchair, or on another fixed portion of the armchair, could be considered.

The back 4, in the horizontal position illustrated in FIG. 13c, thus forms a portion of the bedding surface of the seat according to the invention in lying-down position. To complete the bedding surface obtained with the back 4 so as to be able to accommodate a passenger in lying-down position, additional means such as those illustrated in FIGS. 1 to 4 or 6 to 12 can be considered.

All these embodiments make it possible to have a seat convertible into a bed in simple manner. They can be implemented making very appreciable savings in weight in comparison with known aircraft seats which can be converted into beds. Provision is made for these seats to be surrounded by a vertical wall separating the passenger traveling in this seat from the rest of the cabin space, thus creating an individual space for the passenger in order to enhance his comfort.

In comparison with the convertible seats of the prior art, the bedding surface is not made up of the back, the sitting portion and the footrest, but comprises at most two of these three elements. It also is noted that the frame of the seat, that is, the structure, generally metal, which is intended to hold the aircraft seat in its position while withstanding the mechanical stresses to which the seat can be subjected, is fixed and does not move in relation to the cabin in which it is located.

This invention is not limited to the embodiments described hereinabove by way of nonrestrictive examples. It also relates to all the variant embodiments within the reach of the individual skilled in the trade in the context of the claims hereinbelow.

Thus, for example, other embodiments can be considered. Thus, for example, having an additional berth incorporated into the sitting portion of the seat can be considered. The seat also can be made movable in relation to the frame which bears it.

In all the embodiments presented, the back is used to serve as a bedding surface. A variant in which the back would be left in vertical position, pushed completely toward the rear, also can be considered. The bedding surface then could comprise the fixed sitting portion supplemented at the rear by a fixed cushion extending the sitting portion and at the front by an additional berth stored vertically, for example, cooperating or not cooperating with a unit.

The guiding means for the back can be different from those shown for moving the back. In a variant embodiment, the back can be assembled on a trolley capable of moving in relation to the frame of the seat.

The invention claimed is:

1. A convertible seat configured to accommodate an aircraft passenger, comprising:
a frame;
a sitting portion borne by the frame and including a first end and a second end opposite the first end; and
a back,
wherein the seat is configured to change from a seated position in which the back forms an angle with a horizontal sitting portion to a lying-down position in which the back has a substantially level surface configured to accommodate the passenger in the lying-down position, and when the seat is in the seated position, the back is closer to the first end than to the second end,
wherein the frame is a fixed frame, and the seat further comprises guiding means for changing the back from its seated position to a substantially horizontal position, and at least one additional berth cooperating with the back to form the substantially level surface configured to accommodate the passenger in the lying-down position,
the at least one additional berth is located closer to the second end than to the first end when the seat is in the lying-down position, and
the sitting portion is in a same position relative to the frame when the seat is in the seated position as when the seat is in the lying-down position.

2. A convertible seat according to claim 1, wherein the back has a base and a free end, and the guiding means for the seat comprises translatory guiding means for the base of the back.

3. A convertible seat according to claim 2, further comprising guiding means for making it possible, at a time of changeover of the seat from the seated position to the lying-down position, to guide the back according to a movement that is a combination of a longitudinal translation and a rotation around a substantially transverse horizontal axis such that the back and the sitting portion are a continuation of one another, the base of the back being situated facing a front transverse edge of the sitting portion.

4. Convertible seat according to claim 3, wherein the at least one additional berth is a fixed portion assembled on the frame at the rear of the sitting portion and a continuation thereof.

5. A convertible seat according to claim 1, wherein the back is joined to a fixed part of the seat by two levers located on both sides of the sitting portion, each lever is assembled pivoting around an axis substantially horizontal and transverse in relation to the sitting portion, and the back is assembled pivoting around a substantially horizontal transverse axis between the two levers.

6. A convertible seat according to claim 5, wherein the sitting portion is fastened to the frame, and the levers are assembled on lateral sides of the sitting position.

7. A convertible seat according to claim 5, wherein the levers are joined by a plate.

8. A convertible seat according to claim 5, wherein for each lever a distance between the axis of pivoting of the lever in relation to the sitting portion and the axis of pivoting of the back ranges between one-half and three-quarters of a length of the sitting portion, in a longitudinal direction.

9. A convertible seat according to claim 1, wherein at least one of clamping and locking means holds the back in a turned-up position when the seat is in the seated position.

10. A convertible seat according to claim 1, wherein the additional berth cooperating with the back to form a level surface comprises a shelf configured to move between a substantially horizontal position as a continuation of the back toward a front when the seat is in the lying-down position and a substantially lateral vertical position in the seated position.

11. A convertible seat according to claim 10, wherein the substantially level bedding surface is made up of the back in the substantially horizontal position and the movable shelf.

12. A convertible seat according to claim 10, wherein in the lying-down position, the movable shelf cooperates with the back and a unit arranged facing and at a distance from the frame and a height of which corresponds substantially to that of the sitting portion of the seat.

13. A convertible seat according to claim 1, wherein the sitting portion is assembled pivoting around a transverse axis located close to its front edge to be configured to pivot approximately 180° and then be substantially a continuation of the back in the lying-down position.

14. A convertible seat according to claim 13, wherein the guiding means cooperating with the back to form the substantially level surface comprises the pivoted sitting portion and a unit arranged facing and at a distance from the frame and a height of which corresponds substantially to that of the sitting portion of the seat.

15. A convertible seat according to claim 1, further comprising a footrest assembled pivoting around a transverse axis located close to its front edge to be configured to pivot approximately 90° and then be mefe-ef-less substantially a continuation of the back in the lying-down position.

16. A convertible seat according to claim 15, wherein the guiding means cooperating with the back to form a level surface comprises the pivoted footrest and a unit arranged facing and at a distance from the frame and a height of which corresponds substantially to that of the sitting portion of the seat.

17. A convertible seat according to claim 14, wherein the unit comprises a movable flap configured to pivot approximately 180° around a substantially transverse horizontal axis to form the at least one berth.

18. A convertible seat according to claim 1, wherein the back incorporates the at least one additional berth.

19. A convertible seat according to claim 18, wherein the at least one additional berth incorporated into the back is assembled sliding in relation to the back.

20. A convertible seat according to claim 18, wherein the at least one additional berth incorporated into the back is assembled pivoting in relation to the back.

21. Convertible seat according to claim 1, further comprising a lateral wall surrounding a rear area, behind the convertible seat.

22. Convertible seat according to claim 21, wherein a luggage compartment is provided between the lateral wall and the frame of the seat.

23. Convertible seat according to claim 22, wherein the luggage compartment comprises a lateral door.

24. Convertible seat according to claim 23, wherein the lateral door is a sliding door in a substantially vertical plane with aid of a substantially horizontal guiding rail borne by the lateral wall.

25. Module comprising a seat and a wall surrounding the seat at least partially, wherein the seat is a seat according to claim 1.

26. Aircraft for transport of passengers, comprising at least one convertible seat according to claim 1.

27. A convertible seat according to claim 1, wherein the back is configured to rotate in a first direction when changing from the seated position to the lying-down position, and the at least one additional berth is configured to rotate in a second direction transverse to the first direction when changing from the seated position to the lying-down position.

28. A convertible seat configured to accommodate an aircraft passenger, comprising:
a frame;
a sitting portion borne by the frame and including a first end and a second end opposite the first end;
a back including a base and a free end; and
a jointed footrest along a transverse edge of the sitting portion between a position substantially perpendicular to the sitting portion and a position in which a plane of the sitting portion and a plane of the footrest form an obtuse or straight angle,
wherein the seat is configured to change from a seated position in which the back forms an angle with the sitting portion and its base is close to a rear transverse edge of the sitting portion, to a lying-down position in which the back has a substantially level surface configured to accommodate the passenger in the lying-down position, and when the seat is in the seated position, the back is closer to the first end than to the second end,
wherein the frame is a fixed frame, the back and at most one of the sitting portion and the footrest form the substantially level surface of the seat in the lying-down position, and
at least one additional berth is provided to cooperate with at least one of the sitting portion, the back, and the footrest to form the substantially level surface configured to accommodate the passenger in the lying-down position,
the at least one additional berth is located closer to the second end than to the first end when the seat is in the lying-down position, and
the sitting portion is in a same position relative to the frame when the seat is in the seated position as when the seat is in the lying-down position.

29. A convertible seat according to claim 28, further comprising guiding means for guiding, at a time of changeover of the seat from the seated position to the lying-down position, the back such that the back in the lying-down position comes to cover most of a position of the sitting portion in the seated position.

30. A convertible seat according to claim 29, wherein the back in the lying-down position covers the sitting portion, and a selected edge of the back in the lying-down position comprising the base of the back and its free end is substantially superposed on one edge of the sitting portion.

31. A convertible seat according to claim 29, wherein the guiding means makes it possible, at the time of changeover of the seat from the seated position to the lying-down position, to guide the back according to a movement that is a combination of a longitudinal translation and a rotation around a substantially transverse horizontal axis.

32. A convertible seat according to claim 29, wherein the guiding means comprises on both sides of the frame at least one guiding rail to guide the base of the back, at the time of changeover from the seated position to the lying-down position, from a position corresponding to a rear of the sitting portion in the seated position to a position corresponding to a front of the sitting portion in the seated position.

33. A convertible seat according to claim 29, wherein the guiding means comprises on both sides of the frame at least one guiding rail to guide the base of the back, at the time of changeover from the seated position to the lying-down position, from a position corresponding to a rear of the sitting portion in the seated position to a drawn-back position such that when the base of the back is in the drawn-back position, a free end of the back is in a position corresponding to a front of the sitting portion in the seated position.

34. Convertible seat according to claim 28, wherein the guiding means makes it possible, at a time of changeover of the seat from the seated position to the lying-down position, to guide the back according to a movement that is a combination of a longitudinal translation toward a rear and a rotation around a substantially transverse horizontal axis such that the back in the lying-down position of the seat is substantially perpendicular to a plane of the sitting portion of the seat.

35. Convertible seat according to claim 34, wherein the level surface configured to accommodate a passenger in lying-down position comprises the sitting portion of the seat, a fixed portion assembled on the frame at the rear of the sitting portion and as a continuation of the frame, and a shelf configured to move between a substantially horizontal position as a continuation toward the front of the sitting portion in the lying-down position and a substantially lateral vertical position in the seated position.

36. A convertible seat according to claim 28, wherein the back is configured to rotate in a first direction when changing from the seated position to the lying-down position, and the at least one additional berth is configured to rotate in a second direction transverse to the first direction when changing from the seated position to the lying-down position.

* * * * *